Patented June 20, 1950

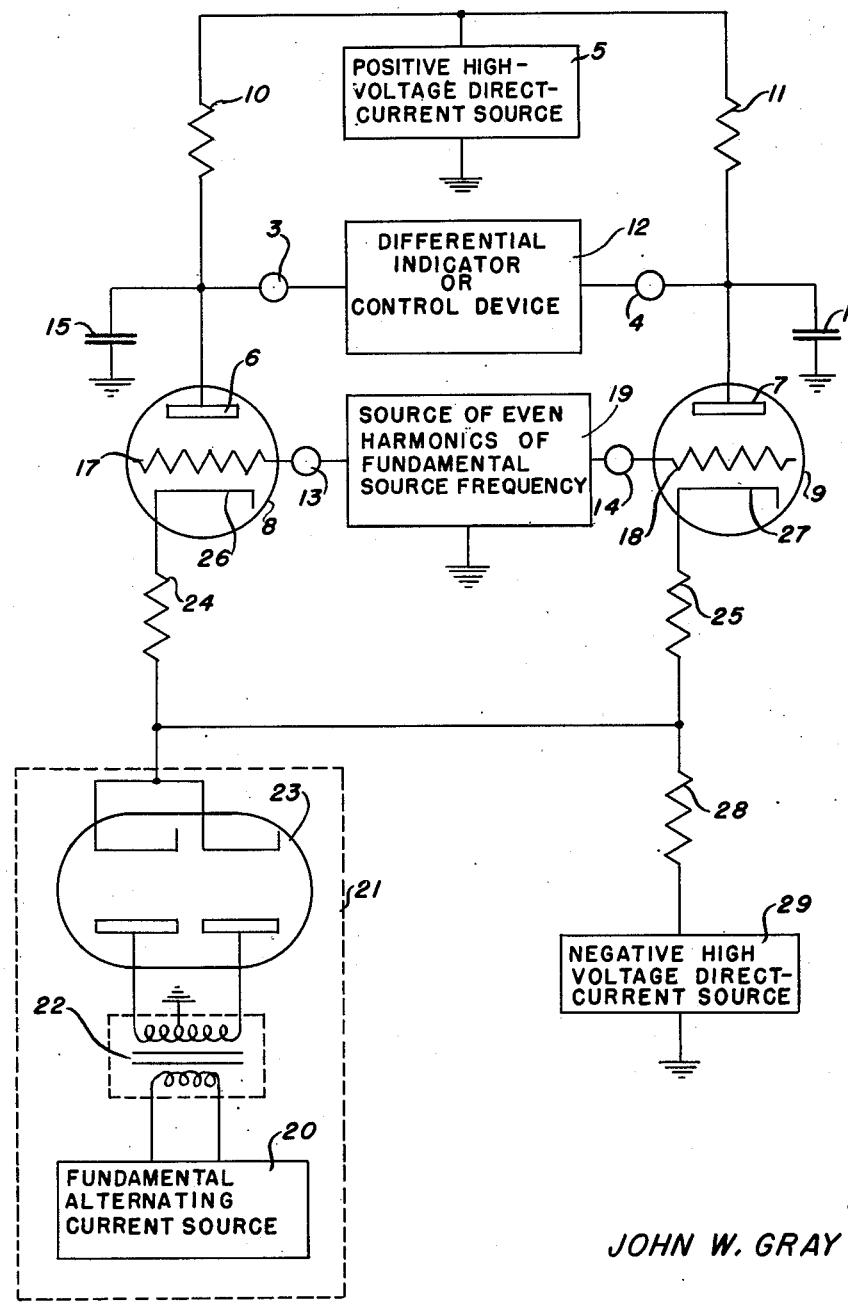

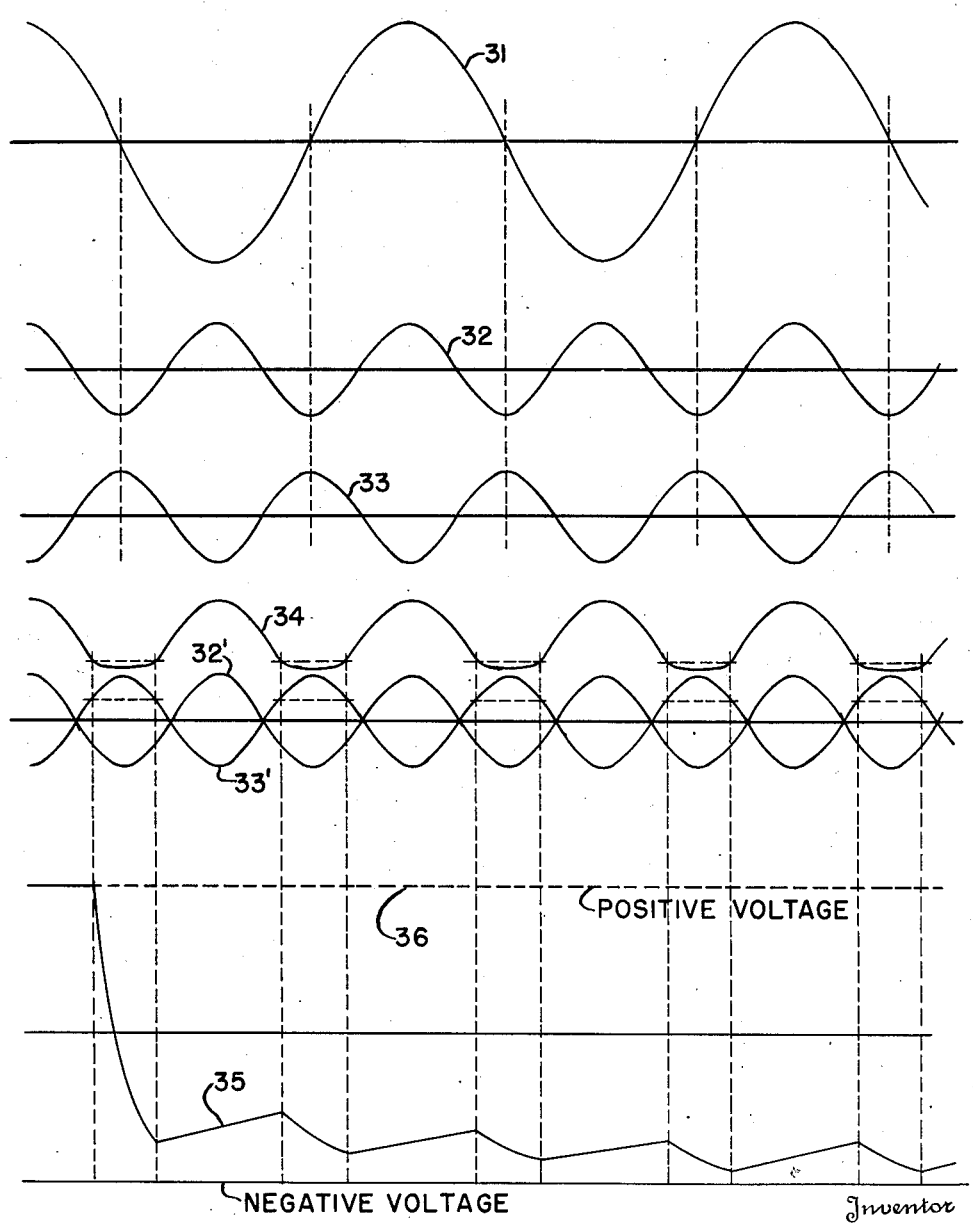

2,512,495

UNITED STATES PATENT OFFICE 2,512,495

CATHODE-GATED AMPLIFYING PHASE DETECTOR

John W. Gray, White Plains, N. Y., assignor to the United States of America as represented by the Secretary of the Navy Application May 16, 1947, Serial No. 748,607

5 Claims. (Cl. 172—245)

This invention relates to electronic phase detectors, and more particularly to amplifying electronic phase detectors of the variety employing cathode gating to obtain the desired phase detection.

A primary object of this invention is to provide a phase detector capable of detecting phase differences between any pair of alternating-current signal voltages which are even harmonics of an alternating-current reference voltage.

Another object of this invention is to provide an amplifying phase detector of the variety described which is readily adaptable for phase detection of error signals in data transmission systems, particularly magnesyn-to-autosyn systems.

Other objects and advantages of this invention will be apparent from the following description and drawings in which Fig. 1 is a schematic diagram of the proposed invention; and Fig. 2 is a group of waveforms of voltages present in the embodiment of Fig. 1.

As shown in Fig. 1, a positive high-voltage direct-current source 5 with a suitable ground connection connects with the plates 6 and 7 of the cathode-gated amplifying phase detector vacuum tubes 8 and 9 through the plate load resistors 10 and 11. The plates 6 and 7 are also directly connected to a conventional differential indicator or control device 12 through the terminals 3 and 4. Condensers 15 and 16 are connected between the plates 6 and 7, respectively, and ground. Out-of-phase voltages which are to be phase detected are coupled to the grids 17 and 18 of the vacuum tubes 8 and 9, through terminals 13 and 14, from the source of these voltages 19 which are even harmonics of the fundamental frequency of the alternating-current reference voltage source 20. Said source of even harmonics could be the error signal output in a magnesyn-to-autosyn system. An unfiltered full-wave rectifier 21 is provided comprising the transformer 22 connected in a conventional manner between the alternating-current source 20 and the rectifier tube 23. The fundamental frequency could be the excitation source for said magnesyn-to-autosyn system. The positive unfiltered output voltage is connected to the common junction of the cathode return resistors 24 and 25 for the cathodes 26 and 27 of the vacuum tubes 8 and 9, respectively. Also connected to this junction through a bleeder resistor 28 is a negative high-voltage direct-current source 29 with its suitable ground connection. It is to be understood that proper bias is provided for the vacuum tubes 8 and 9 by proper selection of resistors and employment of the conventional biasing circuits.

The operation of the apparatus will be described with reference to the embodiment of Fig. 1 and the voltage waveforms of Fig. 2 in which waveform 31 represents the reference voltage from the source 20; waveforms 32 and 32', the voltage at the grid 17; 33 and 33', the voltage at the grid 18; waveform 34, the voltage at the junction of the cathode resistors 24 and 25; waveform 35, the voltage on the plate 7; and waveform 36, the voltage on the plate 6. The waveforms 32 and 33 must have the phase relationship with respect to the fundamental 31 as shown by Fig. 2; i. e., successive positive amplitude peaks of the waveform 32 and successive negative amplitude peaks of the waveform 33 must periodically occur substantially at the zero points of the fundamental 31; or in the phase reversed operation, successive negative amplitude peaks of the waveform 32 and successive positive amplitude peaks of the waveform 33 must periodically occur substantially at the zero points of the fundamental 31. These phase relationships occur in devices operating on magnetic excitation by an alternating source of voltage, particularly autosyns. The flattened portion of waveform 34 is the result of the direct current component from D. C. source 29, i. e. the voltage at the junction remains positive as shown at 34 and the flattened portion occurs when the A. C. voltage from source 20 is insufficient to overcome the negative bias of source 29 and permit rectifier 23 to conduct.

The instantaneous combination of the waveforms 32 and 33 with the waveform 34 of the voltage at the junction of the cathode resistors provides a representation of the instantaneous grid-to-cathode voltage of the vacuum tubes 8 and 9, respectively. Waveform 34 has the waveforms 32' and 33' superimposed for visual combination at any point in time. The vertical distance between the two horizontal broken lines represents the cut-off voltage of the vacuum tubes 8 and 9. The grid bias on tube 8 is measured by the algebraic difference between the instantaneous value of wave 32' and wave 34. The bias on tube 9 is similarly obtained by the difference between wave 33' and wave 34. Thus, it will be seen that conduction in either tube can only take place during the periods indicated between the lines of each pair of vertical broken lines, since only during that period is the bias less than cut-off. Furthermore, referring to waveforms 32' and 34, it will be seen that tube 8 will not conduct during the entire period shown since the bias on grid 17 always exceeds cut-off. Referring now to curves 33' and 34, it will be seen that tube 9 will start conducting at the beginning of the first period, when the algebraic difference between wave 33' and wave 34 is less than cut-off, and will cease at the end of the first period when the algebraic difference is greater than cut-off. Thus, the voltage on plate 7 during said period will be of the form indicated at 35. If the time constant of resistor 11 and condenser 16 is selected to be several times the period of the unfiltered rectifier wave 34, then the voltage at plate 7 will have increased to only a portion of its original value before conduction of tube 9 again occurs, as shown in curve 35. Thus, the condenser 16 acts as a filter to filter out the cycles variations of the plate voltage of plate 7 and, as a result, the plate 7 maintains a substantially constant low direct current level, whereas plate 6 remains at a high level as shown at 36. Resistor 10 and condenser 15 are similarly selected so that the reverse condition will exist on the plates 6 and 7 if the phase of the voltage waveforms 32 and 33 were reversed.

The direct-current voltages appearing at the plates 6 and 7 are then utilized to operate the differential indicator or control device 12 in accordance with the phase of the incoming signals to the grids 17 and 18. In the example depicted, a differential indicator will be deflected from its null point in one sense, whereas under conditions of phase reversal of the even harmonics signals, the differential indicator will be deflected from its null point in the opposite sense, thereby presenting to an observer an indication of the phase of the even harmonic signals.

It can be seen that this device will operate on any pair of substantially 180° related even harmonics of the reference frequency if the phase relationships are such that said even harmonics are phase related to the fundamental frequency so that either the positive or negative amplitude peaks of one of said harmonics and the corresponding negative or positive amplitude peaks of the other of said harmonics periodically occur substantially at the zero points of said fundamental; and further, varying amplitudes of the harmonic frequencies will produce a proportional variation in the indication or control provided by the device 12.

What is claimed is:

1. In an amplifying phase detector for comparing the phases of a wave from a source of fundamental frequency and a wave from a source of frequency evenly harmonically related to said fundamental frequency, the combination comprising: a pair of vacuum tubes having a common cathode connection and input circuits connected to opposite ends of the source of harmonics, respectively, a source of anode potential operatively connected to each of said tubes; and means responsive to the source of fundamental frequency and connected to said cathode connection for controlling the conduction of said tubes.

2. The combination according to claim 1 wherein said controlling means comprises a full-wave rectifier having its output connected to said cathode connection.

3. The combination according to claim 2 wherein said controlling means further comprises a source of direct current potential connected to said rectifier for preventing conduction of said rectifier during its complete cycle.

4. The combination according to claim 1, said tubes having output circuits, respectively, and a time sensitive network connected in each of said output circuits.

5. In combination with a source of alternating current of a fundamental frequency and a source of even harmonics of said fundamental frequency; an amplifying phase detector comprising: a pair of vacuum tubes having a common cathode connection, said tubes having input circuits connected to opposite ends of said source of harmonics, respectively; rectifier means responsive to said source of fundamental frequency and connected to said cathode connection for controlling the conduction of said tubes; and indicator means connected between the output circuits of said tubes.

JOHN W. GRAY.

REFERENCES CITED

The following references are of record in the file of this patent:

UNITED STATES PATENTS

| Number | Name | Date |
| --- | --- | --- |
| 2,140,662 | Zuschlag | Dec. 20, 1938 |
| 2,355,952 | Cooper | Aug. 15, 1944 |
| 2,391,532 | Wilmotte | Dec. 25, 1945 |
| 2,404,810 | O'Brien | July 30, 1946 |
| 2,411,916 | Woodyard | Dec. 3, 1946 |
| 2,420,596 | Howes | May 13, 1947 |